3,067,862
CONVEYOR SYSTEMS
Arthur Thomas Charles Burrows, Stevenage, England, assignor to Geo. W. King Limited, Stevenage, England, a British company
Filed June 16, 1960, Ser. No. 36,620
Claims priority, application Great Britain June 17, 1959
4 Claims. (Cl. 198—208)

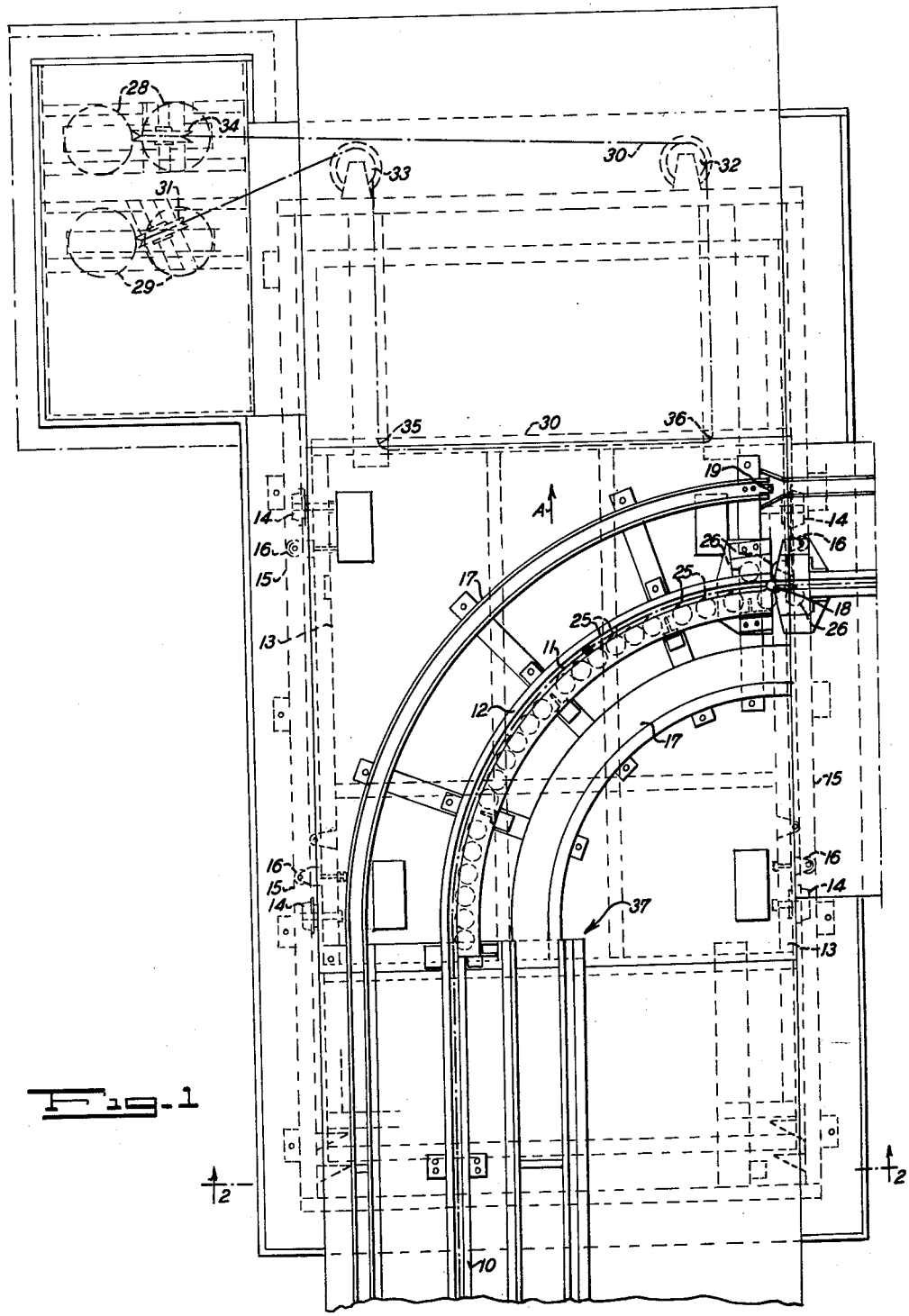

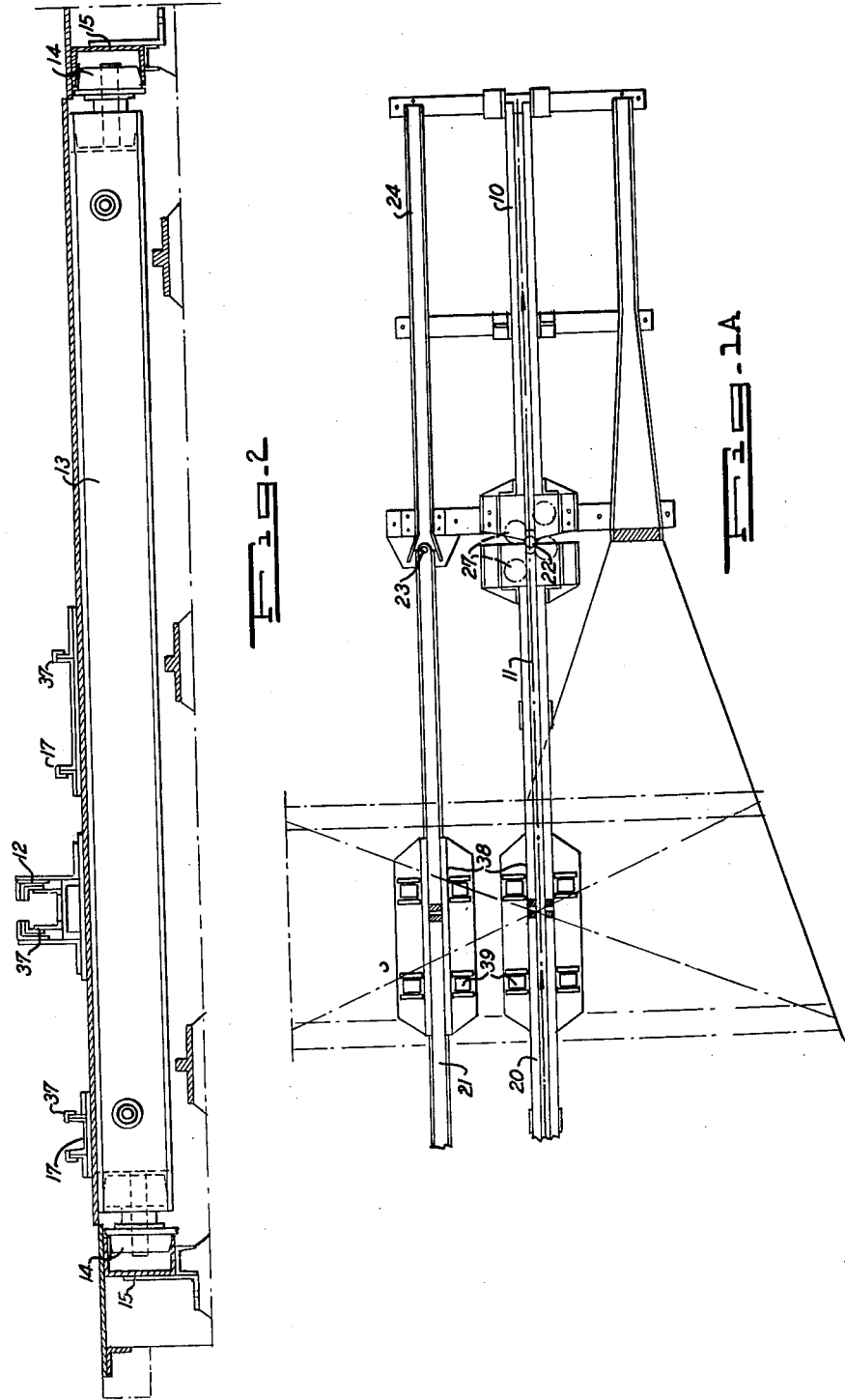

This invention relates to conveyor means of the kind wherein motion is imparted to load carriers by an endless driven chain.

The principal object of the invention is to provide an improved device for maintaining a predetermined tension in such a chain.

According to the invention in the aforenoted conveyor system wherein the chain is arranged to run on or in a track or channel it is proposed to incorporate in said track or channel a movable or adjustable section such that adjustment of the position thereof will result in a variation in the tension on the chain.

In order that the invention may be clearly understood and readily carried into effect the same will be hereinafter more fully described with reference to the accompanying drawings in which:

FIGURE 1 is a plan view of a chain tensioning mechanism,

FIGURE 1A is an extension of the plan view of FIGURE 1,

FIGURE 2 is a section on the line 2—2 of FIGURE 1.

Referring now to the drawing 10 denotes a channelled track in which an endless conveyor chain of known type is adapted to run, such chain being indicated by the dotted line 11. For the purposes of the present description it will be assumed that the track 10 is so arranged that the chain will travel round a closed circuit of, for example, generally rectangular form in plan, and that the chain tensioning mechanism illustrated is disposed at one of the corners of such circuit. As will be seen an appropriately curved section of the chain track designated by 12 is mounted on a mobile frame 13 such frame being supported on freely rotatable wheels 14 running on a fixed track 15. In order to ensure that the frame will be capable of free travel back and forth along the required path laterally directed guide rollers 16 are provided which are adapted to cooperate with appropriate fixed guide surfaces. In the embodiment illustrated, curved track plates designated by 17 are also mounted on the frame 13, such plates being adapted to provide running surfaces for load carrying trays, palettes or the like which are to be driven by the chain. As will be seen the curved chain track 12 and one of the track plates 17 are pivotally connected at 18 and 19 to corresponding track sections designated 20, 21 the latter being in turn pivotally connected at 22, 23 to the fixed chain track 10 and to the appropriate fixed track plate 24 respectively.

By virtue of the pivot connections at 18, 19, 22 and 23, track sections 20 and 21 are pivotable about fixed pivots 22 and 23 and enable displacement of pivots 18 and 19. Curved frame 12 is telescopic at 37 and track sections 20 and 21 are also telescopic so that as frame 13 is moved in the direction of arrow A curved frame 12 displaces pivots 18 and 19 in this direction and telescopes at 37 to also move in the direction of A.

It may be pointed out here that in order to reduce friction and to ensure free travel of the chain 11 around the curved section 12 and also in the region of the pivot points 18, 19 and 22, 23 freely rotatable anti-friction rollers, balls or the like are provided as indicated respectively at 25, 26 and 27. It will also be noted that the inner one of the track plates 17 is so dimensioned as to provide support for the load carrying trays or palettes during their passage round the corner whatever the position of the hinged or pivoted chain track section 12. The frame 13 is biassed or loaded to move in the direction of the arrow A by means of counterweights 28, 29 which are effectively coupled thereto by means of two ropes or cables 30 which are anchored to the centre of the frame and pass around appropriately disposed sheaves or pulleys 31, 32, 33, 34 and guides 35, 36.

The arrangement will normally be such that the tensioning mechanism illustrated will be disposed adjacent the output side of one of the units driving the conveyor chain. A drive unit is not shown in the drawing but such a unit may be of any convenient known type such as is commonly employed in the art.

It will be appreciated that by appropriate selection of the counterweights 28, 29 it will be possible to apply a force of such magnitude to the frame 13 that the section 12 of the chain track will adjust itself i.e. it will move parallel to the track 15 thereby to maintain a preselected tension on the chain 11 at all times.

In order to maintain a continuous chain track and continuity of the track plates despite movements of the frame 13 and of the track section 12 the construction is such that the sections indicated at 37 will be relatively so dimensioned as to be capable of telescoping one into the other. Similarly the track sections 20, 21 will also be telescopic as indicated at 38, those parts of such sections attached to the fixed position pivots 22, 23 being mounted on rollers 39.

Dependent upon the length of the circuit it may be desirable to incorporate therein one or more pivoted track sections of the kind described above. Furthermore while with a rectangularly shaped circuit it is convenient to arrange an adjustable track section at one or more corners of the circuit such an arrangement is not absolutely necessary, nor is it necessary that the track layout should be rectangular.

What is claimed is:

1. A conveyor system having a chain driven at a determinable tension, the conveyor system comprising a track, said chain being guidably supported for movement in said track, said track having first and second portions cooperatively defining a path for said chain, one of said portions having opposite ends operatively associated with the other portion, one of said ends being pivotally connected to the other of said portions, the other of said ends being adapted to telescope in said other portion, a movable frame, said one portion being rigidly connected to said frame for movement therewith, and means operatively coupled to said frame to move the same to adjust the positions of the portions of the frames relative to one another to vary the tension in the chain.

2. A conveyor as claimed in claim 1 wherein said means comprises at least one pulley, a cable coupled to said frame and engaging said pulley, and variable weight means on said cable for exerting a selective force on said movable frame to adjust the tension in the cable.

3. A conveyor as claimed in claim 1 wherein said second portion comprises a fixed and a movable portion, the movable portion being pivoted to the fixed portion, said one portion being pivotally connected to the movable portion, said movable portion being telescopic along its length.

4. A conveyor system as claimed in claim 1 wherein said one portion is a curved portion of track, the other portion being constituted by straight sections of track extending from the opposite ends of the curved portion.

References Cited in the file of this patent

UNITED STATES PATENTS

| | | |
|---|---|---|
| 2,578,592 | Pile | Dec. 11, 1951 |
| 2,695,702 | Ellen | Nov. 30, 1954 |
| 2,794,538 | Schenk | June 4, 1957 |